(12) United States Patent
Song et al.

(10) Patent No.: US 10,445,321 B2
(45) Date of Patent: Oct. 15, 2019

(54) MULTI-TENANT DISTRIBUTION OF GRAPH DATABASE CACHES

(71) Applicant: LinkedIn Corporation, Sunnyvale, CA (US)

(72) Inventors: Yongling Song, Dublin, CA (US); Jane Alam Jan, Santa Clara, CA (US); Brent D. Miller, Sunnyvale, CA (US); Tianqiang Li, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 419 days.

(21) Appl. No.: 15/438,194

(22) Filed: Feb. 21, 2017

(65) Prior Publication Data
US 2018/0239796 A1 Aug. 23, 2018

(51) Int. Cl.
*G06F 16/2455* (2019.01)
*G06F 16/901* (2019.01)
*G06F 16/28* (2019.01)

(52) U.S. Cl.
CPC ...... *G06F 16/24552* (2019.01); *G06F 16/282* (2019.01); *G06F 16/9024* (2019.01)

(58) Field of Classification Search
CPC ............. G06F 16/24552; G06F 16/282; G06F 16/9024
USPC .......................... 707/691, 714, 741, 760, 798
See application file for complete search history.

(56) References Cited

U.S. PATENT DOCUMENTS

| | | |
|---|---|---|
| 7,376,639 B2 | 5/2008 | Kutsch |
| 8,185,558 B1 | 5/2012 | Narayanan |
| 8,443,005 B1 * | 5/2013 | Goldman ............... G06Q 50/01 707/798 |
| 8,533,182 B1 | 9/2013 | Charboneau |
| 8,736,612 B1 | 5/2014 | Goldman |
| 9,189,520 B2 | 11/2015 | May |
| 9,292,570 B2 | 3/2016 | Sargeant |
| 9,372,891 B2 | 6/2016 | Elias |
| 9,378,303 B1 | 6/2016 | Shankar |

(Continued)

FOREIGN PATENT DOCUMENTS

| | | |
|---|---|---|
| EP | 2937797 A1 | 10/2015 |
| WO | 2012091844 A1 | 7/2012 |

OTHER PUBLICATIONS

Lei Zou et al., "Summarization Graph Indexing: Beyond Frequent Structure-Based Approach", DASFAA 2008, LNCS 4947, pp. 141-155, XP-019087336, Mar. 2008.

(Continued)

*Primary Examiner* — Dung K Chau
(74) *Attorney, Agent, or Firm* — Park, Vaughan, Fleming & Dowler LLP; Chia-Hsin Suen

(57) ABSTRACT

The disclosed embodiments provide a system for performing multi-tenancy distribution of a graph database cache. During operation, the system obtains a cache of a set of records in a graph database storing a graph, wherein the graph includes a set of nodes, a set of edges between pairs of nodes in the set of nodes, and a set of predicates. Next, the system identifies one or more records in the cache that fail a validation test. The system then merges a remainder of the cache with online updates to the subset of records to produce a merged version of the cache. Finally, the system distributes the merged version to one or more instances of the graph database for use in processing queries of the graph database.

20 Claims, 7 Drawing Sheets

(56) References Cited

U.S. PATENT DOCUMENTS

| | | |
|---|---|---|
| 9,495,427 B2 | 11/2016 | Abadi |
| 2003/0084043 A1 | 5/2003 | Acharya |
| 2004/0078379 A1* | 4/2004 | Hinshaw ............ G06F 16/2308 |
| 2006/0101081 A1* | 5/2006 | Lin .................... G06F 16/2343 |
| 2007/0192306 A1 | 8/2007 | Papakonstantinou |
| 2007/0239694 A1 | 10/2007 | Singh |
| 2008/0116449 A1 | 5/2008 | Macready |
| 2008/0306910 A1 | 12/2008 | Singh |
| 2009/0132503 A1 | 5/2009 | Sun |
| 2009/0240649 A1 | 9/2009 | Sereni |
| 2009/0240682 A1 | 9/2009 | Balmin |
| 2011/0270861 A1 | 11/2011 | Arshavsky |
| 2012/0005224 A1 | 1/2012 | Ahrens |
| 2012/0047114 A1 | 2/2012 | Duan |
| 2012/0096043 A1 | 4/2012 | Stevens, Jr. |
| 2012/0136884 A1 | 5/2012 | Kanawa |
| 2012/0179644 A1 | 7/2012 | Miranker |
| 2012/0284255 A1 | 11/2012 | Schechter |
| 2013/0091122 A1 | 4/2013 | Salch |
| 2013/0097180 A1 | 4/2013 | Tseng |
| 2014/0156632 A1 | 6/2014 | Yu |
| 2014/0172914 A1 | 6/2014 | Elinkety et al. |
| 2014/0201234 A1 | 7/2014 | Lee et al. |
| 2014/0280044 A1 | 9/2014 | Huynh et al. |
| 2014/0310302 A1 | 10/2014 | Wu |
| 2014/0330867 A1 | 11/2014 | Sarkar |
| 2014/0337373 A1 | 11/2014 | Morsi |
| 2015/0012523 A1 | 1/2015 | Dey |
| 2015/0026158 A1 | 1/2015 | Jin |
| 2015/0052134 A1 | 2/2015 | Bornea |
| 2015/0106359 A1* | 4/2015 | Venkataramani ... G06F 12/0844 707/722 |
| 2015/0120717 A1 | 4/2015 | Kim |
| 2015/0120775 A1 | 4/2015 | Shao |
| 2015/0127677 A1 | 5/2015 | Wang |
| 2015/0134637 A1 | 5/2015 | Pall |
| 2015/0149435 A1 | 5/2015 | McKenna |
| 2015/0169686 A1 | 6/2015 | Elias |
| 2015/0234888 A1 | 8/2015 | Ahmed |
| 2015/0302300 A1 | 10/2015 | Fletcher |
| 2016/0071233 A1 | 3/2016 | Macko |
| 2016/0171540 A1 | 6/2016 | Mangipudi |
| 2016/0179883 A1* | 6/2016 | Chen ................. G06F 16/24528 707/714 |
| 2016/0188594 A1 | 6/2016 | Ranganathan |
| 2016/0246842 A1 | 8/2016 | Li |
| 2016/0260011 A1 | 9/2016 | Corvinelli |
| 2017/0010968 A1 | 1/2017 | Li |
| 2018/0365148 A1* | 12/2018 | Snodgrass ........... G06F 12/0811 |

OTHER PUBLICATIONS

David W. Williams, "Graph Database Indexing Using Structured Graph Decomposition", 2007 IEEE, pp. 976-985, XP031095841, Apr. 2007.

Vijayan Prabhakaran, "Managing Large Graphs on Multi-Cores With Graph Awareness", USENIX, pp. 1-12, XP061013942, Apr. 11, 2013.

* cited by examiner

MULTI-TENANT DISTRIBUTION OF GRAPH DATABASE CACHES

RELATED APPLICATIONS

The subject matter of this application is related to the subject matter in a co-pending non-provisional application by inventors Srinath Shankar, Rob Stephenson, Andrew Carter, Maverick Lee and Scott Meyer, entitled "Graph-Based Queries," having Ser. No. 14/858,178, and filing date Sep. 18, 2015, which issued on Jan. 3, 2017 as U.S. Pat. No. 9,535,963.

The subject matter of this application is also related to the subject matter in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016.

BACKGROUND

Field

The disclosed embodiments relate to graph databases. More specifically, the disclosed embodiments relate to techniques for performing multi-tenancy distribution of graph database caches.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding of or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
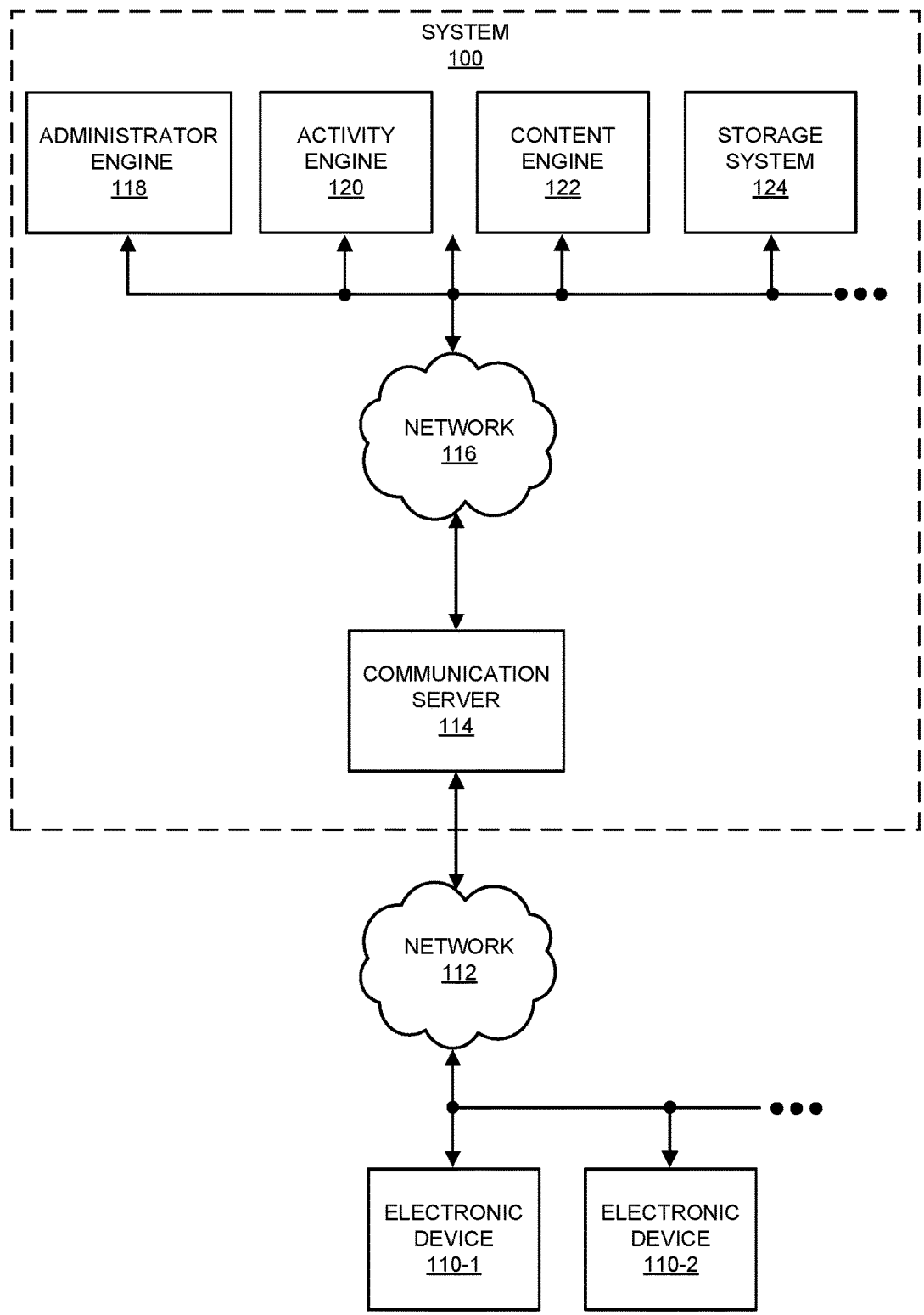
FIG. 1 shows a schematic of a system in accordance with the disclosed embodiments.

The disclosed embodiments provide a method, apparatus, and system for performing multi-tenancy distribution of graph database caches. A system 100 for performing a graph-storage technique is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices, i.e., a large-scale distributed storage system.

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors).

Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

In order to address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
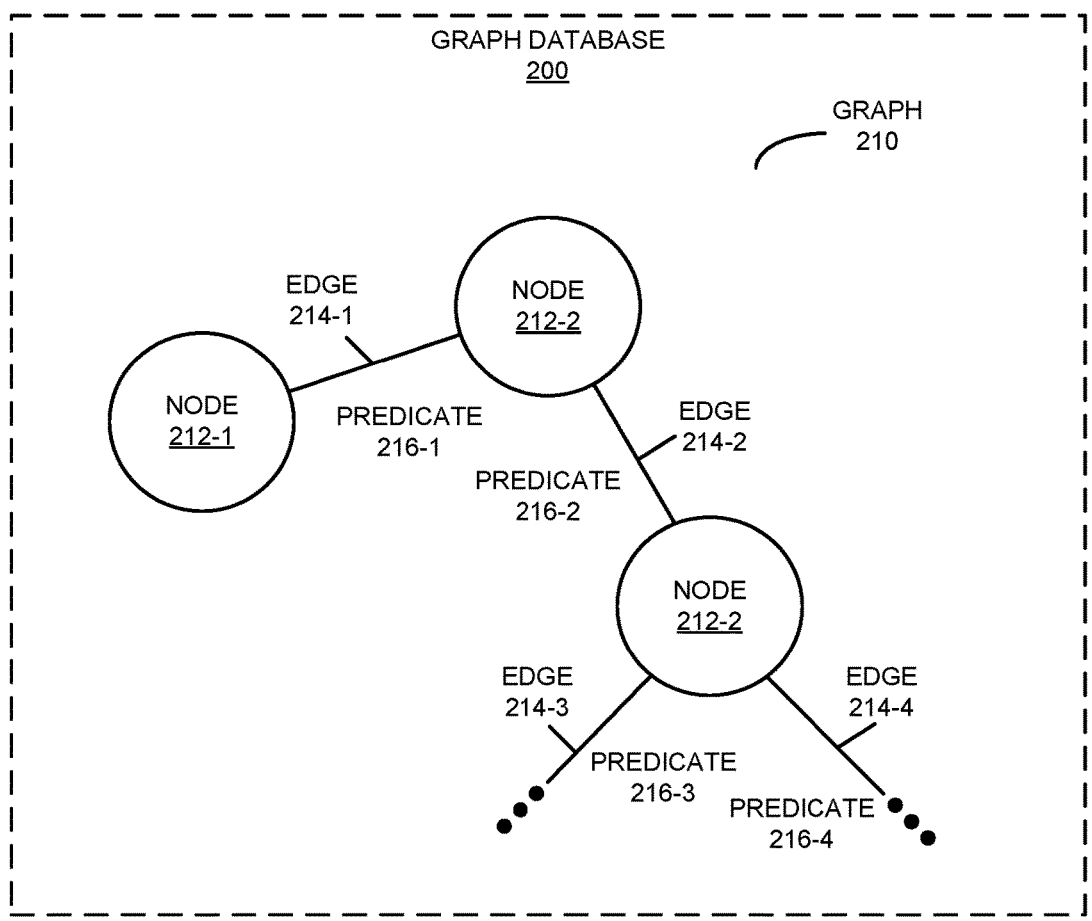
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, i.e., so that each node 212 in graph 210 includes a direct edge to its adjacent nodes without using an index lookup.

Each edge in graph 210 may be specified in a (subject, predicate, object) triple. For example, an edge denoting a connection between two members named "Alice" and "Bob" may be specified using the following statement:

Edge("Alice", "ConnectedTo", "Bob")

In the above statement, "Alice" is the subject, "Bob" is the object, and "ConnectedTo" is the predicate.

In addition, specific types of edges and/or more complex structures in graph 210 may be defined using schemas. Continuing with the previous example, a schema for employment of a member at a position within a company may be defined using the following:

```
DefPred("Position/company", "1", "node", "0", "node").
DefPred("Position/member", "1", " node", "0", "node").
DefPred("Position/start", "1", "node", "0", "date").
DefPred("Position/end_date", "1", "node", "0",
     "date").
M2C(positionId, memberId, companyId, start, end) :-
  Edge(positionId, "Position/member", memberId),
  Edge(positionId, "Position/company", companyId),
  Edge(positionId, "Position/start", start),
  Edge(positionId, "Position/end_date", end)
```

In the above schema, the employment is represented by four predicates, followed by a rule with four edges that use the predicates. The predicates include a first predicate representing the position at the company (e.g., "Position/company"), a second predicate representing the position of the member (e.g., "Position/member"), a third predicate representing a start date at the position (e.g., "Position/start"), and a fourth predicate representing an end date at the position (e.g., "Position/end_date"). In the rule, the first edge uses the second predicate to specify a position represented by "positionId" held by a member represented by "memberId," and the second edge uses the first predicate to link the position to a company represented by "companyId." The third edge of the rule uses the third predicate to specify a "start" date of the member at the position, and the fourth edge of the rule uses the fourth predicate to specify an "end" date of the member at the position.

Graph 210 and the associated schemas may additionally be used to populate graph database 200 for processing of queries against the graph. More specifically, a representation of nodes 212, edges 214, and predicates 216 may be obtained from a source of truth, such as a relational database, distributed filesystem, and/or other storage mechanism, and stored in a log in the graph database. Lock-free access to the graph database may be implemented by appending changes to graph 210 to the end of the log instead of requiring modification of existing records in the source of truth. In turn, the graph database may provide an in-memory cache of the log and an index for efficient and/or flexible querying of the graph.

In other words, nodes 212, edges 214, and predicates 216 may be stored as offsets in a log that is read into memory in graph database 200. For example, the exemplary edge statement for creating a connection between two members named "Alice" and "Bob" may be stored in a binary log using the following format:

| 256 | Alice |
| 261 | Bob |
| 264 | ConnectedTo |
| 275 | (256, 264, 261) |

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in the log, offsets in the log may be used as identifiers for the changes. Continuing with the previous example, the offset of 275 may be used as a unique identifier for the edge representing the connection between "Alice" and "Bob." The offsets may additionally be used as representations of virtual time in the graph. More specifically, each offset in the log may represent a different virtual time in the graph, and changes in the log up to the offset may be used to establish a state of the graph at the virtual time. For example, the sequence of changes from the beginning of the log up to a given offset that is greater than 0 may be applied, in the order in which the changes were written, to construct a representation of the graph at the virtual time represented by the offset.

Note that graph database 200 may be an implementation of a relational model with constant-time navigation, i.e., independent of the size N, as opposed to varying as log(N). Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include embodiments of methods that allow the data associated with the applications and/or the social network to be efficiently stored and retrieved from graph database 200 and/or otherwise manipulated. Such methods are described in a co-pending non-provisional application by inventors Srinath Shankar, Rob Stephenson, Andrew Carter, Maverick Lee and Scott Meyer, entitled "Graph-Based Queries," having Ser. No. 14/858,178, and filing date Sep. 18, 2015, which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. For example, graph database 200 may be configured to store data associated with a variety of flexible schemas using edges representing subjects, objects, and predicates in the graph. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
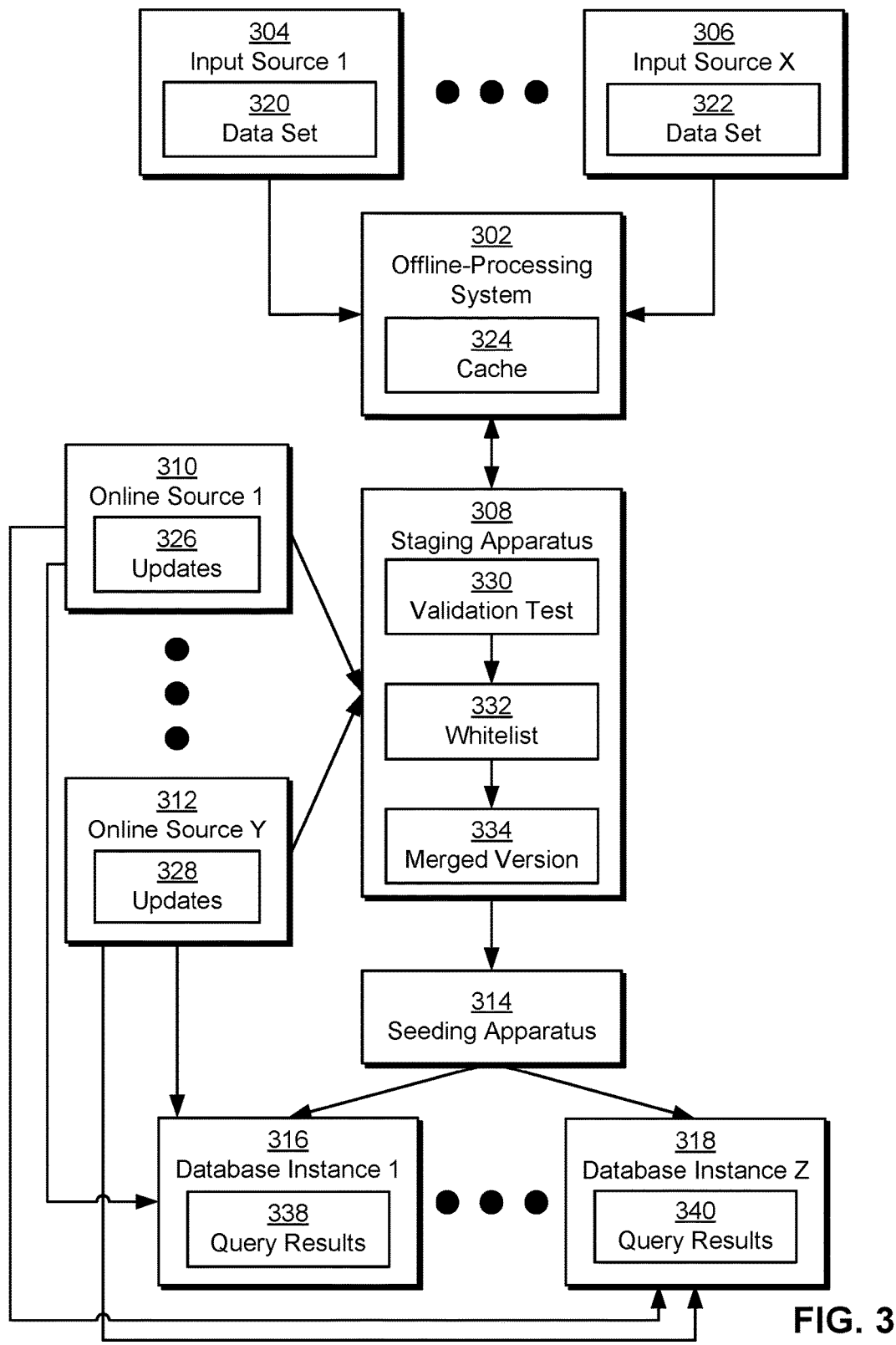
FIG. 3 shows a system for performing multi-tenancy distribution of a graph database cache in accordance with the disclosed embodiments.

In one or more embodiments, queries of graph database 200 are processed using a cache of graph database 200 that is periodically updated and distributed to instances of graph database 200. As shown in FIG. 3, an offline-processing system 302 may create a cache 324 of graph database 200 using data sets 320-322 from a number of input sources (e.g., input source 1 304, input source x 306). For example, offline-processing system 302 may use batch processing to generate a new version of cache 324 from data sets 320-322 on a periodic (e.g., hourly, daily, weekly, etc.) basis.

After cache 324 is generated, cache 324 may be copied into a staging apparatus 308 that generates a merged version 334 of cache 324 using updates 326-328 to the graph database from a number of online sources (e.g., online source 1 310, online source y 312) of graph database data. For example, staging apparatus 308 may merge individual nodes, edge types, and/or other subsets of data in cache 324 with a snapshot of recent changes to the subsets received from one or more event streams, data-processing change capture systems, and/or other sources of real-time or near-real-time graph database updates 326-328. Thus, merged version 334 may represent a more up-to-date version of the graph database than the original cache 324 generated by offline-processing system 302.

After merged version 334 is deemed consistent with data in one or more database instances (e.g., database instance 1 316, database instance z 318) that process queries of the graph database (e.g., within a lag time of one second), merged version 334 is loaded from staging apparatus 308 into a seeding apparatus 314. Seeding apparatus 314 may then copy the cached data to the database instances to allow the database instances to process the queries using the most recently generated cache of the graph database. For example, seeding apparatus 314 and/or another component of the system may take an individual database instance offline and copy merged version 334 to a virtual or physical server, cluster, and/or other set of computing resources on which the database instance runs. As the copying takes places, other database instances may continue generating and returning query results 338-340 in response to queries of the graph database. After the copying is complete, the database instance may resume executing, and seeding apparatus 314 may execute the cache-copying process with another database instance. Thus, seeding apparatus 314 may sequentially load the newest cache of the graph database onto database instances until all database instances have been updated with the newest cache.

In one or more embodiments, cache 324 and/or merged version 334 is used to generate an index of graph database 200 that is loaded into memory of the database instances for efficient lookup of edges by subject, predicate, object, and/or other keys or parameters 310. Index structures for graph databases are described in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016, which is incorporated herein by reference.

Input sources used to generate cache 324 may represent different locations, teams, and/or other entities associated with generating or providing the corresponding data sets 320-322. For example, each data set may contain graph database records for a given edge type, which may be defined by a predicate, schema, and/or node types of the subject and object associated with the predicate or schema. Because data sets 320-322 may be created, managed, loaded, and/or stored in the respective input sources by different groups of administrators, developers, and/or users, creation of a complete, up-to-date cache 324 may be impeded by stale, missing, duplicate, non-conforming, inaccurate, and/or otherwise "bad" data from any data set.

In one or more embodiments, the system of FIG. 3 includes functionality to perform timely generation and distribution of cache 324 without requiring all data sets 320-322 used to create cache 324 to be complete, accurate, and/or up-to-date. First, staging apparatus 308 may perform a validation test 330 on data in cache 324 to generate a whitelist 332 of one or more data sets 320-322 that contain validated and/or verified data. For example, staging apparatus 308 may apply a set of rules in validation test 330 to identify subsets of records in cache 324 that contain missing, stale, duplicate, non-conforming, inaccurate, and/or other types of "bad" data. If one or more invalid records are found in a given data set, the entire data set may be omitted from whitelist 332. Moreover, some or all of the records in the data set may be examined during validation test 330 to determine if the data set is to be included in or omitted from whitelist 332. In another example, staging apparatus 308 may perform a consistency check that verifies that data in cache 324 matches data stored in the database instances. In a third example, staging apparatus 308 may verify that nodes, edges, and/or predicates in cache 324 adhere to bidirectional connections (e.g., a connection between two nodes is represented by an edge from a first node to a second node and a second edge from the second node to the first node), rules for defining complex structures in the graph database, and/or a schema for the graph database. If any portion of cache 324 is found to fail validation test 330, staging apparatus 308 may omit the portion from whitelist 332 and/or cache 324.

Verification or validation of data sets 320-322 may also, or instead, be performed by offline-processing system 302 prior to generating cache 324. For example, offline-processing system 302 may use validation test 330 to identify duplicate, lost, inaccurate, incorrectly formatted, and/or otherwise invalid records in data sets 320-322. Offline-processing system 302 may then use the validation results to generate whitelist 332 and create cache 324 using only the data sets in whitelist 332.

Next, staging apparatus 308 may use cache 324, whitelist 332, and updates 326-328 to generate merged version 334. For example, staging apparatus 308 may convert data in updates 326-328 into the same structure or format as data in cache 324. Staging apparatus 308 may then replace individual records, groups of related records, and/or entire data sets 320-322 in cache 324 that are identified by validation test 330 as containing bad data with the corresponding converted records and/or data sets from the online sources to generate merged version 334.

Staging apparatus 308 may also apply validation test 330 and/or a different validation test to updates 326-328 to ensure that bad data from the online sources is not included in merged version 334. If invalid updates among updates 326-328 are found by the validation test, staging apparatus 308 may transmit records from cache 324 to repositories associated with the online sources as replacements for the invalid updates instead of including the invalid updates in merged version 334.

Staging apparatus 308 may optionally add newer graph database updates 326-328 to older data in cache 324, independently of replacing invalid data in cache 324 with data from the corresponding updates 326-328. For example, staging apparatus 308 may include, in merged version 334, edge updates that have been received from the online sources since cache 324 was created by offline-processing system 302. Consequently, staging apparatus 308 may create merged version 334 in a way that omits bad data from input sources and online sources and provides a more up-to-date version of the graph database than the originally generated cache 324. Creation of merged versions of graph database caches is described in further detail below with respect to FIG. 4.

After generating merged version 334, staging apparatus 308 may copy merged version 334 to seeding apparatus 314, and seeding apparatus 314 may load merged version 334 into individual database instances, as described above. In turn, the database instances may combine data from merged version 334 and online updates 326-328 to generate query results 338-340 that reflect the current state of the graph database. For example, the database instances may append real-time or near-real-time graph database updates from an event stream, change capture system, and/or other source to an in-memory index generated using merged version 334. The database instances may then process queries of the graph database by performing lookups of the index structure generated from merged version 334, followed by scanning through online updates 326-328 appended to the index structure after the creation of merged version 334.

Conversely, if all data sets 320-322 are found to be valid by validation test 330, offline-processing system 302, staging apparatus 308, and/or another component associated with performing validation test 330 may indicate, using whitelist 332 and/or another mechanism, that creation of merged version 334 is optional. In turn, staging apparatus 308 may omit creation of merged version 334 of cache 324. Instead, staging apparatus 308 may copy cache 324 directly to seeding apparatus 314 for expedited deployment of cache 324 to the database instances. Alternatively, staging apparatus 308 may proceed with creation of merged version 334 by adding newer data from recent updates 326-328 to older data in cache 324 instead of using updates 326-328 to replace invalid data in cache 324.

Those skilled in the art will appreciate that the system of FIG. 3 may be implemented in a variety of ways. First, offline-processing system 302, staging apparatus 308, and seeding apparatus 314 may be provided by a single physical machine, multiple computer systems, one or more virtual machines, a grid, one or more clusters, one or more databases, one or more filesystems, and/or a cloud computing system. Offline-processing system 302, staging apparatus 308, and seeding apparatus 314 may additionally be implemented together and/or separately by one or more hardware and/or software components and/or layers.

Second, generating and/or updating of cache 324 from data sets 320-322 and/or online updates 326-328 may be performed by various components of the system. For example, validation and/or verification of data in cache 324 may be performed one or more times by offline-processing system 302, staging apparatus 308, and/or seeding apparatus 314. Each round of validation or verification may be followed by the generation of a new merged version (e.g., merged versions 334) of cache 324. Alternatively, updating of cache 324 with online graph database updates 326-328 may occur independently of validation and/or verification of the data in cache 324.

Third, validation and/or verification of data in cache 324 and/or merged version 334 may be performed in a number of ways. For example, validation test 330 may be used to generate blacklists of bad or invalid data from cache 324 and/or updates 326-328 instead of whitelists containing valid or verified data.

Figure 4:
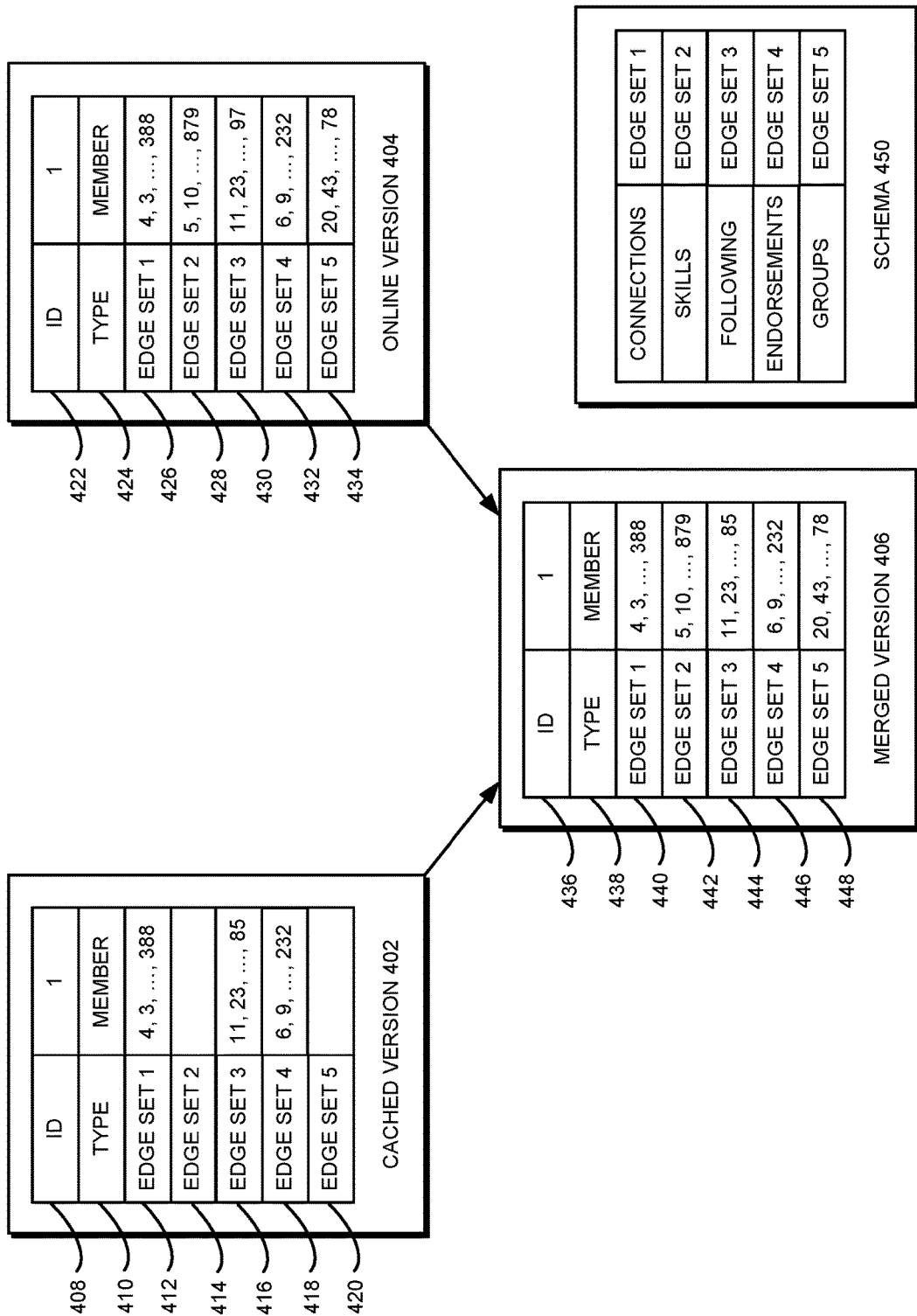
FIG. 4 shows an exemplary merging of a cached version and an online version of data in a graph database in accordance with the disclosed embodiments.

FIG. 4 shows an exemplary merging of a cached version 402 and an online version 404 of data in a graph database in accordance with the disclosed embodiments. More specifically, FIG. 4 shows the creation of a merged version 406 of data associated with a node in a graph database from cached version 402 of the data and online version 404 of the data.

As shown in FIG. 4, cached version 402, online version 404, and merged version 406 share a common structure for storing data associated with the node. Within the common structure, various attributes and edges associated with the node are specified in a number of data elements (i.e., elements 408-420 of cached version 402, elements 422-434 of online version 404, elements 436-448 of merged version 406). In particular, the common structure includes a node identifier (ID) of 1, which is stored in the first data element (i.e., elements 408, 422, and 436) of the structure. The common structure also includes a node type of "MEMBER," which is stored in the second data element (i.e., elements 410, 424, and 438) of the structure. Thus, the first two data elements in the structure may contain attributes that identify and describe the node in the graph database.

After the first two elements, the common structure includes additional data elements storing a number of edge sets related to the node (i.e., elements 410-420 in cached version 402, elements 426-434 in online version 404, elements 440-448 in merged version 406). Each edge set may include a series of ordered offsets into a log-based representation of the graph database, with each offset identifying an edge between the node and another node in the graph database.

Edge sets in the structure are additionally grouped by edge type, as defined by a schema 450 for the structure and/or graph database. Schema 450 indicates that "EDGE SET 1" stored in data elements 412, 426, and 440 contains edges associated with a "CONNECTIONS" edge type and "EDGE SET 2" stored in data elements 414, 428, and 442 contains edges associated with a "SKILLS" edge type. Schema 450 also indicates that "EDGE SET 3" stored in data elements 416, 430, and 444 contains edges associated with a "FOLLOWING" edge type and that "EDGE SET 4" stored in data elements 418, 432, and 446 contains edges associated with an "ENDORSEMENT" edge type. Finally, schema 450 indicates that "EDGE SET 5" stored in data elements 420, 434, and 448 contains edges associated with a "GROUPS" edge type. Consequently, the structure shared by cached version 402, online version 404, and merged version 406 may define a particular node in the graph database and list, by edge type, groups of edges between the node and other nodes in the graph database. In turn, the structure may be used to efficiently process queries for edges in the graph database that match specific edge types and/or node IDs.

Cached version 402 may be included in a cache of the graph database that is generated from multiple data sets by an offline-processing system, such as offline-processing system 302 of FIG. 3. As mentioned above, each data set may be generated, loaded, stored, and/or maintained by a different team, set of users, and/or other entity. Moreover, data sets that fail a validation test (e.g., validation test 330 of FIG. 3) may be omitted from the cache, and in turn, portions of cached version 402 supplied by the data sets. As a result, cached version 402 may contain an incomplete and/or out-of-date set of edges for the node. For example, cached version 402 may contain empty edge sets in data elements 414 and 420 because the corresponding data sets have been removed from the cache after failing the validation test. Conversely, one or both data elements 414 and 420 may lack edge offsets because the node was not associated with edges of the corresponding edge types at the time of creation of the cache.

On the other hand, online version 404 may be included in a snapshot of the graph database that is generated from one or more online sources of graph database updates (e.g., updates 326-328 of FIG. 3). Data in online version 404 may differ from data in cached version 402 because of differences in the availability of valid data and/or time of generation of cached version 402 and online version 404. For example, data elements 428 and 434 in online version 404 may contain non-empty edge sets that are generated from validated online graph database updates, while the corresponding data elements 414 and 420 of cached version 402 may have empty edge sets after invalid data is removed from the cache. In another example, the latest offset in data element 430 (i.e., "97") of online version 404 may differ from the latest offset in the corresponding data element 416 (i.e., "85") of cached version 402 because data element 430 includes an update to the graph database that was made after creation of the data set used to populate data element 416.

To improve the quality and completeness of data in the cache, a merged version 406 of the node is created by merging the edge sets of cached version 402 and online version 404. In merged version 406, data elements 440, 444 and 446 contain edge offsets from the respective data elements 412, 416 and 418 of cached version 402, and data elements 442 and 448 contain edge offsets from the respective data elements 428 and 434 of online version 404. Alternatively, data element 444 may contain edge offsets from data element 430 instead of data element 416 and/or combine edge offsets from both data elements 416 and 430 to provide more up-to-date data in merged version 406. Selection of data elements from cached version 402 and online version 404 for inclusion in merged version 406 may be performed using a whitelist of valid data that is generated by the validation test. Merged version 406 may then be generated by combining different data elements from cached version 402 and online version 404 within the same common structure for the node instead of replacing entire node-level records in the cache with data from the online updates.

Because merged version 406 contains a compact representation of edge sets that is more complete and/or up-to-date than cached version 402, merged version 406 may facilitate efficient storage and lookup of edges associated with the node by database instances. For example, the inclusion of a more complete set of edges in merged version 406 may reduce subsequent appending of graph database updates to an index generated from the cache, which in turn may reduce the memory footprint of the index and overhead associated with scanning the appended updates during processing of graph database queries using the index.

Figure 5:
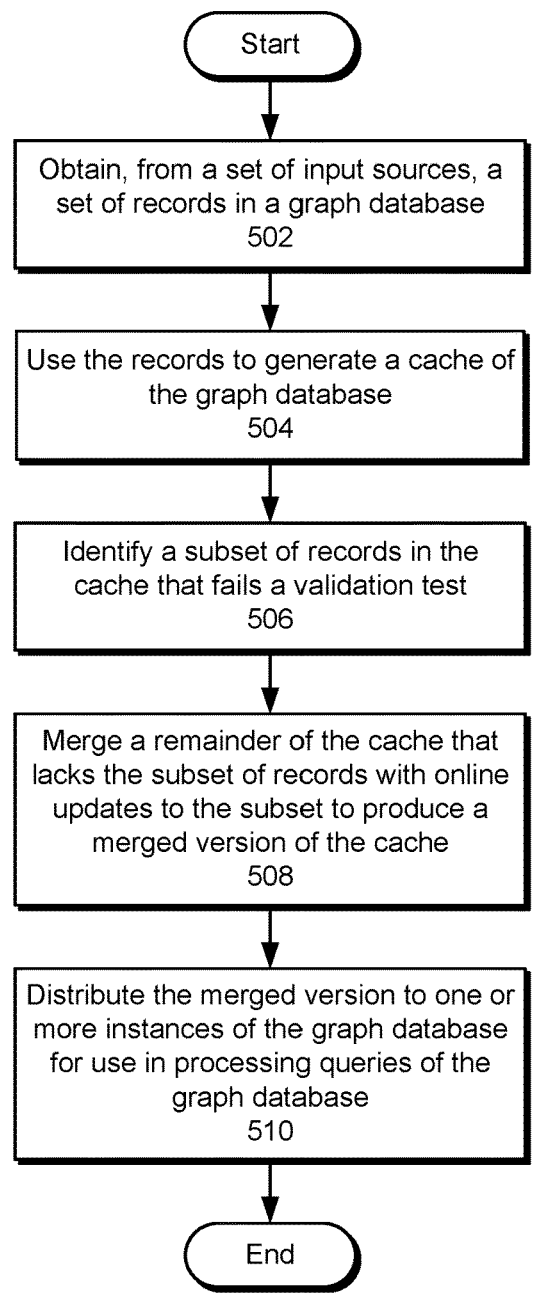
FIG. 5 shows a flowchart illustrating the process of performing multi-tenancy distribution of a graph database cache in accordance with the disclosed embodiments.

FIG. 5 shows a flowchart illustrating the process of performing multi-tenancy distribution of a graph database cache in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, a set of records in a graph database is obtained from a set of input sources (operation 502) and used to generate a cache of the graph database (operation 504). The graph database may store a graph containing a set of nodes, a set of edges between pairs of nodes, and a set of predicates. The records may be maintained in separate data sets by different teams, users, and/or entities. For example, each data set may contain data for a different edge type (e.g., connections, employments, group memberships, endorsements, following of companies, following of members, skills, titles, education, location, etc.) in the graph database. Different data sets may be loaded into different input sources (e.g., paths, directories, storage systems, etc.), and the cache may be generated from the loaded data sets on a periodic basis.

After the cache is created, a subset of records in the cache that fails a validation test is identified (operation 506). For example, a set of rules in the validation test may be applied to the cache to identify records or data sets that are duplicated, lack bidirectional connections, lack up-to-date data, and/or are otherwise invalid.

To improve the quality and/or completeness of the cache, a remainder of the cache that lacks the subset of records is merged with online updates to the subset to produce a merged version of the cache (operation 508), as described in further detail below with respect to FIG. 6. Finally, the merged version is distributed to one or more instances of the graph database for use in processing queries of the graph database (operation 510). In turn, the graph database instances may use the merged version and additional online updates to the graph database to generate an index of the graph database and/or process queries of the graph database.

Figure 6:
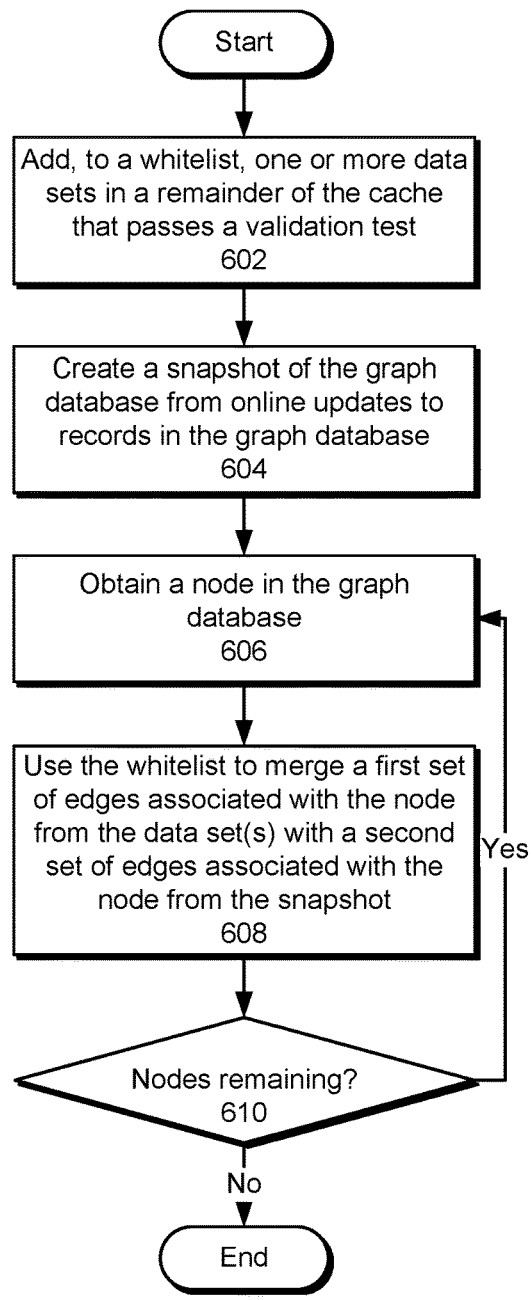
FIG. 6 shows a flowchart illustrating the process of generating a merged version of a cache of a graph database in accordance with the disclosed embodiments.

FIG. 6 shows a flowchart illustrating the process of generating a merged version of a cache of a graph database in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

First, one or more data sets in a remainder of the cache that passes a validation test are added to a whitelist (operation 602). Alternatively, data sets that do not pass the validation test may be added to a blacklist. Next, a snapshot of the graph database is created from online updates to records in the graph database (operation 604). For example, the online updates may be obtained from event streams, change detection systems, and/or other sources of real-time or near-real-time graph database changes. The online updates may then be used to generate records in the snapshot in the same structure as records in the cache. For example, each record in the cache and the snapshot may include a node identifier, a node type associated the node identifier, a list of edge types associated with the node identifier, and a set of edges associated with the edge types.

The validated data set(s) and snapshot may then be merged on a node-by-node basis. In particular, a given node in the graph database is obtained (operation 606), and the whitelist is used to merge a first set of edges associated with the node from the data set(s) with a second set of edges associated with the node from the snapshot (operation 608). For example, the whitelist may be used to identify edge sets for the node that pass the validation test, which are then merged with other edge sets for the node from the snapshot. If a blacklist is used instead of the whitelist, edge sets identified in the blacklist may be obtained from the snapshot and merged with other edge sets for the same node from the cache. Operations 606-608 are then repeated for remaining nodes in the graph database (operation 610).

Figure 7:
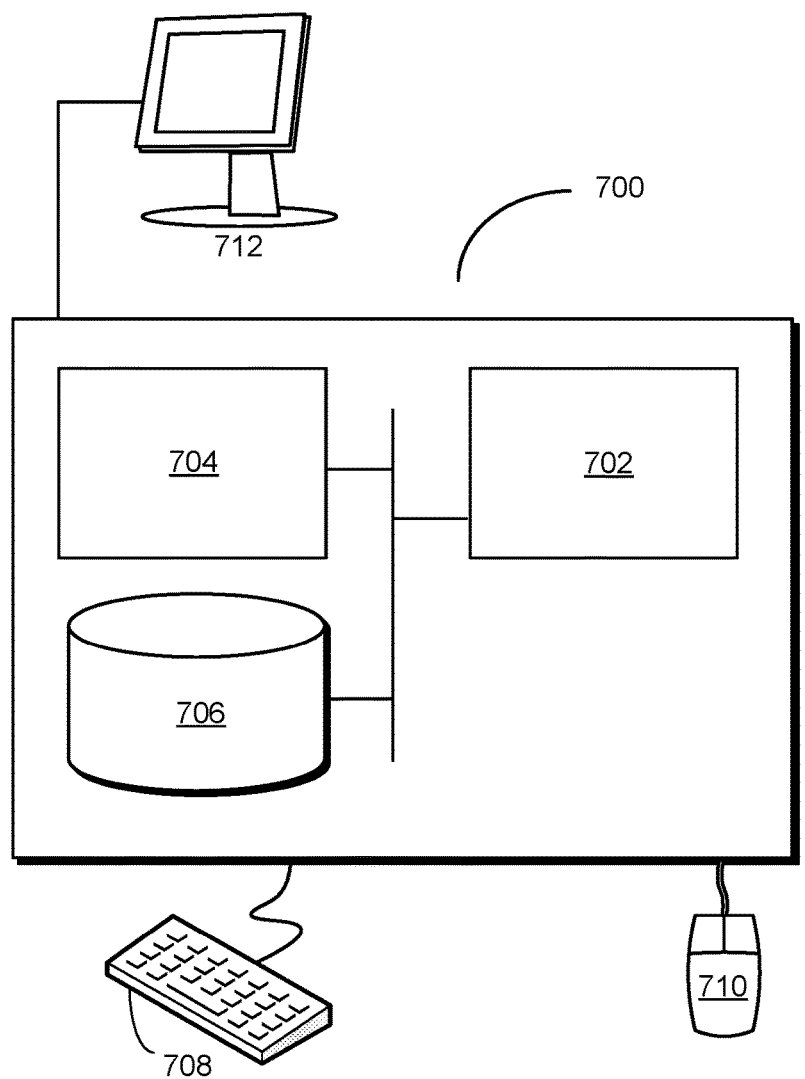
FIG. 7 shows a computer system in accordance with the disclosed embodiments.

FIG. 7 shows a computer system 700. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for performing multi-tenancy distribution of a graph database cache. The system includes a staging apparatus that obtains a cache of a set of records in a graph database storing a graph. Next, the staging apparatus identifies a subset of the records in the cache that fails a validation test. The staging apparatus then merges a remainder of the cache that lacks the subset of the records with online updates to the subset of records to produce a merged version of the cache. The system also includes a seeding apparatus that distributes the merged version to one or more instances of the graph database for use in processing queries of the graph database.

In addition, one or more components of computer system 700 may be remotely located and connected to the other components over a network. Portions of the present embodiments (e.g., input sources, offline-processing system, staging apparatus, seeding apparatus, database instances, etc.) may also be located on different nodes of a distributed system that implements the embodiments. For example, the present embodiments may be implemented using one or more clusters and/or a cloud computing system that generates a graph database cache from data in a set of remote input and online sources and distributes the cache to database instances for processing of queries from a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining a cache of a set of records in a graph database storing a graph, wherein the graph comprises a set of nodes, a set of edges between pairs of nodes in the set of nodes, and a set of predicates;
    identifying, by one or more computer systems, a subset of the records in the cache that fails a validation test;
    merging, by the one or more computer systems, a remainder of the cache that lacks the subset of the records with online updates to the subset of records to produce a merged version of the cache; and
    distributing the merged version to one or more instances of the graph database for use in processing queries of the graph database.

2. The method of claim 1, wherein obtaining the cache comprises:
    obtaining the set of records from a set of input sources; and
    using the set of records to generate the cache.

3. The method of claim 2, wherein using the set of records to generate the cache comprises:
    generating an index of the graph database from the set of records.

4. The method of claim 1, wherein identifying the subset of records in the cache that fails the validation test comprises:
    applying a set of rules in the validation test to the cache to identify the subset of records as failing the validation test.

5. The method of claim 4, wherein the subset of records comprises at least one of:
    a duplicate record;
    a lack of a bidirectional connection; and
    a lack of up-to-date data in the graph database.

6. The method of claim 1, wherein merging the remainder of the cache that lacks the subset of records with online updates to the subset of records to produce the merged version of the cache comprises:
    adding, to a whitelist, one or more data sets in the remainder of the cache; and
    using the whitelist to merge the one or more data sets with a snapshot of the graph database created from the online updates.

7. The method of claim 6, wherein using the whitelist to merge the one or more data sets with the snapshot comprises:
    for each node in the set of nodes, merging a first set of edges associated with the node from the one or more data sets with a second set of edges associated with the node from the snapshot.

8. The method of claim 6, wherein each data set in the one or more data sets is associated with an edge type in the graph database.

9. The method of claim 1, wherein processing queries of the graph database comprises:
    using the merged version and additional online updates to the graph database to process queries of the graph database.

10. The method of claim 1, wherein the set of predicates is associated with at least one of:
    a connection;
    an employment;
    a group membership;
    an endorsement;
    a following of a company;
    a following of a member;
    a skill of the member;
    a title of the member;
    an education of the member at a school; and
    a location of the member.

11. The method of claim 1, wherein the cache comprises:
    a node identifier;
    a node type associated the node identifier;
    a list of edge types associated with the node identifier; and
    a set of edges associated with the edge types.

12. An apparatus, comprising:
    one or more processors; and
    memory storing instructions that, when executed by the one or more processors, cause the apparatus to:
        obtain a cache of a set of records in a graph database storing a graph, wherein the graph comprises a set of nodes, a set of edges between pairs of nodes in the set of nodes, and a set of predicates;
        identify a subset of the records in the cache that fails a validation test;

merge a remainder of the cache that lacks the subset of the records with online updates to the subset of records to produce a merged version of the cache; and distribute the merged version to one or more instances of the graph database for use in processing queries of the graph database.

13. The apparatus of claim 12, wherein obtaining the cache comprises:

obtaining the set of records from a set of input sources; and using the set of records to generate the cache.

14. The apparatus of claim 13, wherein using the set of records to generate the cache comprises:

generating an index of the graph database from the set of records.

15. The apparatus of claim 12, wherein the subset of records comprises at least one of:

a duplicate record;

a lack of a bidirectional connection; and a lack of up-to-date data in the graph database.

16. The apparatus of claim 15, wherein merging the remainder of the cache that lacks the subset of records with online updates to the subset of records to produce the merged version of the cache comprises:

adding, to a whitelist, one or more data sets in the remainder of the cache; and using the whitelist to merge the one or more data sets with a snapshot of the graph database created from the online updates.

17. The apparatus of claim 16, wherein using the whitelist to merge the one or more data sets with the snapshot comprises:

for each node in the set of nodes, merging a first set of edges associated with the node from the one or more data sets with a second set of edges associated with the node from the snapshot.

18. The apparatus of claim 12, wherein processing queries of the graph database comprises:

using the merged version and additional online updates to the graph database to process queries of the graph database.

19. A system, comprising:

one or more processors;

staging module comprising a non-transitory computer-readable medium comprising instructions that, when executed by the one or more processors, cause the system to:

obtain a cache of a set of records in a graph database storing a graph, wherein the graph comprises a set of nodes, a set of edges between pairs of nodes in the set of nodes, and a set of predicates;

identify a subset of the records in the cache that fails a validation test; and merge a remainder of the cache that lacks the subset of the records with online updates to the subset of records to produce a merged version of the cache; and a seeding module comprising a non-transitory computer-readable medium comprising instructions that, when executed by the one or more processors, cause the system to distribute the merged version to one or more instances of the graph database for use in processing queries of the graph database.

20. The system of claim 19, wherein merging the remainder of the cache that lacks the subset of records with online updates to the subset of records to produce the merged version of the cache comprises:

adding, to a whitelist, one or more data sets in the remainder of the cache; and using the whitelist to merge the one or more data sets with a snapshot of the graph database created from the online updates.

* * * * *